March 23, 1948.　　O. W. HALING　　2,438,163
INNER PISTON RING
Filed Jan. 19, 1944
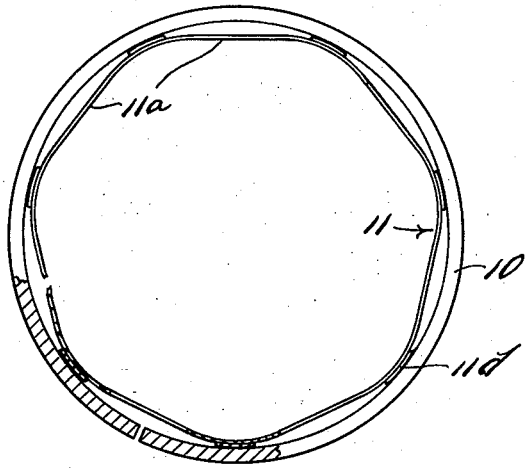
Fig.-1.
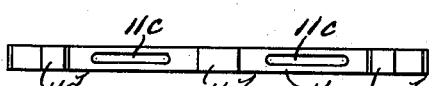
Fig.-2.
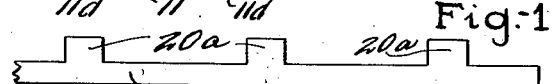
Fig.-11.
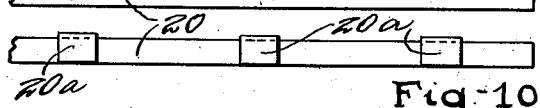
Fig.-10.
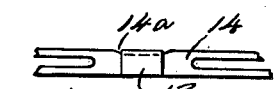
Fig.-3.
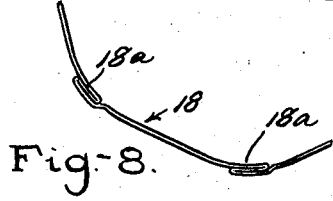
Fig.-8.
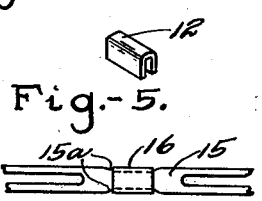
Fig.-4.
Fig.-5.
Fig.-6.
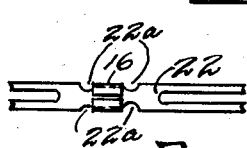
Fig.-9.
Fig.-12.
Fig.-7.
Inventor:
OTTO W. HALING
By Chas. C. Reif
Attorney.

Patented Mar. 23, 1948

2,438,163

UNITED STATES PATENT OFFICE 2,438,163

INNER PISTON RING

Otto W. Haling, Rochester, Minn.

Application January 19, 1944, Serial No. 518,853

10 Claims. (Cl. 309—43)

1

This invention relates to a piston ring and particularly to a piston ring known as an inner ring. With many piston rings now used in internal combustion engines and especially in automobile engines, an inner ring is placed inside the piston ring which engages the cylinder wall for the purpose of expanding the latter ring and keeping it in the desired contact with the cylinder wall. A common form of inner ring has been one made of a resilient strip of material bent to fit in the outer ring and engage the wall thereof at circumferentially spaced points. One serious defect with such inner rings is that they are flexed more or less in the reciprocations of the piston and flexing occurs at the point where they are bent, which are the points at which they engage the outer ring. The section of the inner ring is thus reduced by wear and the resiliency of the ring decreases in proportion as the section is reduced. In time therefore, the resiliency of the ring is gradually reduced by wear and the ring operates only at a small percentage of its original efficiency.

It is an object of this invention to provide an inner ring for a piston ring constructed and arranged so that its resiliency, and thus its efficiency, will be maintained even after long use. It is a further object of the invention to provide an inner ring for a piston ring, said inner ring being made of a strip of resilient material bent to engage the inner wall of the piston ring at circumferentially spaced points, additional material being placed on said ring at said points whereby any wear will be taken by said additional material and the section and resilience of the inner ring will not be impaired by use.

It is a further object of the invention to provide such an inner ring as above set forth in which said added material may take the form of a small plate or clip folded over said ring or folded about said ring.

It is still another object of the invention to provide an inner ring formed of a strip of resilient material bent to extend about and engage the inner wall of a piston ring at circumferentially spaced points, said strip being bent reversely upon itself at said points to form portions having a plurality of layers and thus increased thickness.

These and other objects and advantages of the invention will be fully set forth in the following description made in connection with the accompanying drawings in which like reference characters refer to similar parts throughout the several views and in which:

Fig. 1 is a plan view of the ring showing the same within an outer ring, certain parts being shown in horizontal section;

Fig. 2 is a view in side elevation of the inner ring;

Fig. 3 is a partial view in horizontal section of a modification also showing a portion of the outer ring;

Fig. 4 is a view in side elevation of the inner ring shown in Fig. 3;

Fig. 5 is a perspective view of a small plate or clip used with the ring;

Fig. 6 is a partial view in side elevation of a modified form of inner ring;

Fig. 7 is a perspective view of a small clip used with the ring shown in Fig. 6;

Fig. 8 is a partial plan view of a modified form of inner ring;

Fig. 9 is a view in side elevation of the ring shown in Fig. 8;

Fig. 10 is a partial view in side elevation of a modification;

Fig. 11 is a partial view in side elevation also of said latter modification; and Fig. 12 is a view similar to Fig. 6 showing a modification.

Referring to the drawings in Figs. 1 and 2 a piston ring 10 is shown which is one form of outer ring used in pistons on internal combustion engines. Said ring 10 is usually made of resilient material and has spaced ends as shown. To expand the ring 10 an inner ring 11 is used, said ring 11 being made of a strip of resilient material and bent to fit within the ring 10 and engage the wall of ring 10 at circumferentially spaced points. Ring 11 thus has separate portions 11a out of contact with the inner wall of ring 10. While strip 11 could be variously made, in the embodiment of the invention illustrated it is substantially rectangular in vertical cross section and the same may be provided with elongated slots 11c as shown in Fig. 2. At the points 11b where the ring 11 engages the inner wall of ring 10 additional material 11d is provided and while this could take various forms, in the embodiment of the invention illustrated said material is formed by small plates equally in width to the ring 11 secured thereto in any suitable manner as by welding. The portions 11d of the ring thus engage the inner wall of the outer ring 10 and the body portion proper of strip 11 does not engage said wall.

In Figs. 3 and 4 a small clip or piece of metal 12 is bent into channel or U-shape and this is placed over the ring 14, said ring being provided with a hollow recess 14a to compensate for the thickness of the web portion of channel 12. The sides of the channel member 12 thus extend at each side of ring 14. Member 12 could be tightly pressed on ring 14 or could be secured thereto in any suitable manner as by spot welding.

In Figs. 5 and 6 a ring 15 is shown and this has folded thereabout a small plate or clip 16 shown in Fig. 7. Clip 16 extends along the outer side of ring 15, is folded over the edges thereof and down along the inner side. Ring 15 is provided with recesses 15a at opposite sides and at its top and bottom edges so that the width of member 16 may be substantially the same as the width of ring 15.

In Figs. 8 and 9 another form of inner ring 18 is shown which will be made of a strip of resilient material preferably substantially rectangular in vertical cross section, and said strip is shown as folded reversely upon itself at spaced circumferential points 18a where it engages the outer ring so that at said points 18a there are three thicknesses of the strip. Ring 18 is also shown as having slots 18b therein and such slots are also shown in the ring shown in Figs. 4 and 6. If desired ring 18 could be upset or made a little thicker adjacent the folded portions 18a.

In Fig. 11 a cut-out blank for an inner ring is shown, which may be used to make the structure of ring shown in Figs. 1 and 2. The strip 20 will be cut by a die or otherwise so as to have spaced lateral projections 20a thereon. These projections will be folded over against the side of the ring as shown in Fig. 10. The length of the projection 20a will be substantially the width of the strip or ring 20 plus the thickness thereof so that when the projections 20a are folded over against the side of the strip 20 their end edges will be substantially flush with the end of the strip 20 as shown in Fig. 10. The strip 20 can then be bent to form the inner ring shown in Fig. 1 and the bent over projections or tabs 20a will correspond to the parts 11b shown in Fig. 1. This constitutes a simple and convenient method for forming the additional portions shown as 11d in Fig. 1 which contact the outer ring 10. If desired, the portions 20a could be spot welded to the strip 20.

In Fig. 12 a ring 22 similar to that in Fig. 6 is shown having the clip 16 folded thereabout and preferably secured thereto. Recesses 22a are formed at each edge of the ring adjacent clip 16. This makes the ring more flexible and somewhat offsets the weight of clip 16.

In operation the ring 11 will be placed in the outer ring 10 and due to its resiliency it will act to expand the ring 10 to hold it in proper relation to the cylinder wall. As stated, the inner ring usually wears due to motion and chafing in the ring groove as it usually is rather loose in the groove. There is some wear due to flexing. An inner ring usually has an initial spring pressure of 12 pounds. With the common prior structures this would be reduced by wear to 6 pounds in about 5,000 miles of travel of the automobile. Any wear on the rings of this invention will be taken by the portions 11d and any wear on the rings 14 and 15 will be taken by the clips 12 and 16. The section of the strips or of the rings will thus not be reduced by wear and the ring will have the same resiliency after long use as it had when new. The ring thus continues to do its intended work at full efficiency. The ring could be used until the portions 11d, 12 and 16 of increased thickness were entirely worn away before the ring shown in Figs. 8 and 9. The wear will be taken by the outer layer of the three superposed layers so that the resiliency of the ring will be maintained. The inner ring will thus continue to function at 100 percent efficiency even after long wear.

From the above description it will be seen that I have provided a simple and yet highly efficient structure of inner ring and one which overcomes a very serious objection to the inner rings as made in the prior art. The ring can be very easily and quickly produced and the cost thereof will be but little over the cost of previous rings. The device has been amply demonstrated in actual practice and found to be very successful and efficient.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. An inner ring for a piston ring adapted to be disposed in the ring groove of a piston with said piston ring comprising a substantially polygonal resilient strip having a number of portions adapted to extend about the inner wall of said piston ring in spaced relation thereto, and portions adapted to lie adjacent said wall between said first mentioned portion, and a thin plate secured to said inner ring at said last mentioned portions, said plate having a width substantially the same as the width of said inner ring and being adapted to engage said wall throughout the circumferential extent of said plate to take the wear caused by flexing of said inner ring whereby the resiliency of said inner ring will not be reduced in operation.

2. An inner ring for expanding an outer piston ring and adapted to be disposed in a ring groove of a piston with said piston ring, said inner ring being made of a thin strip of resilient material bent into substantially polygonal shape and adapted to fit into said outer ring and lie adjacent the latter solely at circumferentially spaced zones about the inner wall thereof, and pieces of flat metal folded over said inner ring so as to extend across the width thereof at the outer side thereof and be secured thereto at said zones whereby said pieces will contact said wall and the wear of said ring due to flexing will be taken by said pieces and the resiliency of said inner ring will not be reduced in operation.

3. An inner ring for a piston ring adapted to be disposed in a ring groove of a piston with said piston ring comprising a number of spring portions adapted to extend about the inner side of said piston ring in spaced and chordal relation thereto, said portions being connected at points in proximity to the inner wall of said piston ring and a body of metal having a width substantially the same as the width of said inner ring and of small circumferential extent carried by said inner ring at the outer side thereof and adjacent said points and adapted to engage said wall throughout substantially its whole circumferential extent to take the wear on said inner ring whereby the resiliency thereof will not be reduced in operation.

4. An expander spring for piston rings comprising a thin generally polygonal split strip of ribbon steel having a plurality of outwardly bowed crimps and a plurality of connecting reaches therefor, the crimps having opposed notches in their edges at the crowns thereof, and clip-like wear members folded transversely around the crimps within said notches to clampingly embrace the crimps, the folded edges of the wear members being substantially flush with the edges of the crimps and the edges of the notches engaging the edges of the wear member to support them against longitudinal movement.

5. An expander spring for piston rings comprising a generally polygonal split strip of spring steel having a plurality of outwardly bowed crimps and a plurality of connecting reaches therefor, and wear members secured in overlying relation to the crowns of the crimps with the side edges substantially flush with the side edges of the crimps.

6. An expander spring for piston rings comprising a thin generally polygonal split strip of ribbon steel having a plurality of outwardly bowed longitudinally spaced crimps, and wear members of uniform width and thickness folded transversely around the crimps at the crowns thereof and secured to said crowns against movement longitudinally of the expander spring.

7. An expander spring for piston rings comprising a thin generally polygonal split strip of ribbon steel having a plurality of outwardly bowed crimps and a plurality of connecting reaches therefor, and clip-like wear members folded transversely of said strip at the outer side of said crimps, whereby said wear members will contact the inner wall of said ring and the wear of said ring due to flexing will be taken by said wear members and the resiliency of said strip will not be reduced in operation.

8. An expander spring for piston rings comprising a thin generally polygonal split strip of ribbon steel having a plurality of outwardly bowed crimps and a plurality of connecting reaches therefor, said strip having circumferentially spaced portions thereof folded to lie against the outer side of said crimps.

9. An expander spring for piston rings comprising a thin generally polygonal split strip of ribbon steel having a plurality of outwardly bowed longitudinally spaced crimps, and wear members of uniform width and thickness folded transversely over said crimps at the crowns thereof and secured against movement longitudinally of said expander spring.

10. An inner ring for expanding an outer piston ring and adapted to be disposed in a ring groove of a piston with said piston ring, said inner ring being made of a thin strip of resilient material bent to fit into said outer ring and contact the latter solely at circumferentially spaced zones about the inner wall thereof, and pieces of flat metal folded over said inner ring so as to extend across the width thereof at the outer side thereof and be secured thereto at said zones whereby said pieces will contact said wall and the wear of said ring due to flexing will be taken by said pieces and the resiliency of said inner ring will not be reduced in operation, said inner ring being reduced in width adjacent said points so that the total width of said pieces will be substantially the total width of said inner ring.

OTTO W. HALING.

REFERENCES CITED

The following references are of record in the file of this patent:

UNITED STATES PATENTS

| Number | Name | Date |
|---|---|---|
| 1,668,779 | Packer | May 8, 1928 |
| 1,723,432 | Morton | Aug. 6, 1929 |
| 1,801,815 | Livermore | Apr. 21, 1931 |
| 1,888,994 | Marien | Nov. 29, 1932 |
| 2,006,901 | Maller | July 2, 1935 |
| Re. 19,900 | Krebs | Mar. 24, 1936 |
| 2,044,451 | Teetor | June 16, 1936 |
| 2,152,127 | Zahodiakin | Mar. 28, 1939 |
| 2,164,849 | Williams | July 4, 1939 |
| 2,236,721 | Teetor | Apr. 1, 1941 |
| 2,280,201 | Thompson | Apr. 21, 1942 |